(12) United States Patent
Häußer-Böhm et al.

(10) Patent No.: US 7,812,545 B2
(45) Date of Patent: Oct. 12, 2010

(54) CIRCUIT ARRANGEMENT FOR CONTROLLING THE OPERATION OF AN ELECTRONIC TRANSFORMER

(75) Inventors: Helmut Häußer-Böhm, Traunreuth (DE); Jörg Lott, Chieming (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 240 days.

(21) Appl. No.: 11/990,261

(22) PCT Filed: Aug. 29, 2006

(86) PCT No.: PCT/EP2006/065776

§ 371 (c)(1),
(2), (4) Date: Feb. 11, 2008

(87) PCT Pub. No.: WO2007/025967

PCT Pub. Date: Mar. 8, 2007

(65) Prior Publication Data

US 2009/0102394 A1    Apr. 23, 2009

(30) Foreign Application Priority Data

Aug. 30, 2005 (DE) .................. 10 2005 041 077

(51) Int. Cl.
*H05B 37/02* (2006.01)
(52) U.S. Cl. .................. 315/224; 315/226; 315/291
(58) Field of Classification Search ............ 315/209 R, 315/224, 225, 291, DIG. 4, 226; 323/357, 323/355; 363/123, 132

See application file for complete search history.

(56) References Cited

U.S. PATENT DOCUMENTS

| | | | |
|---|---|---|---|
| 4,612,480 A * | 9/1986 | Kneisel | 315/224 |
| 4,862,041 A * | 8/1989 | Hirschmann | 315/246 |
| 5,740,021 A * | 4/1998 | Lecheler et al. | 363/37 |
| 6,144,568 A | 11/2000 | Franck et al. | |
| 6,157,551 A * | 12/2000 | Barak et al. | 363/37 |
| 7,521,878 B2 * | 4/2009 | Green | 315/291 |
| 2003/0127994 A1 * | 7/2003 | Patchornik et al. | 315/291 |

FOREIGN PATENT DOCUMENTS

| | | |
|---|---|---|
| EP | 0 957 662 A1 | 11/1999 |
| GB | 219586 | 7/1924 |
| GB | 2 393 859 A | 4/2004 |

\* cited by examiner

*Primary Examiner*—Thuy Vinh Tran

(57) ABSTRACT

A circuit arrangement for controlling the operation of an electronic transformer (1) whose power supply can be lowered. The electronic transformer (1) is electrically connected to an output of a switch (7), and the switch (7) can be controlled by a control unit (5). A radio interference suppression circuit (8) is coupled to the switch (7) and, according to a control state, which exists on the switch (7), for controlling the starting behavior of the electronic transformer (1), the radio interference suppression circuit (8) can be disconnected from the switch (7) and/or an output (A) of the switch (7) can be short-circuited. A method for controlling the operation of an electronic transformer is also disclosed.

19 Claims, 2 Drawing Sheets

CIRCUIT ARRANGEMENT FOR CONTROLLING THE OPERATION OF AN ELECTRONIC TRANSFORMER

This Application is a National Phase application filed under 35 U.S.C. 371, claiming the benefit of an international application PCT/EP2006/065776, filed Aug. 29, 2006, which claims priority from German application 10 2005 041 077.4, filed Aug. 30, 2005.

TECHNICAL FIELD

The present invention relates to a circuit arrangement for controlling the operation of an electronic transformer.

PRIOR ART

It is known to dim the voltage supply or the mains voltage of electronic transformers which are used, for example, for supplying energy to electric lamps. In conventional systems, customary installation dimmers are used for this purpose which are switched off mechanically. However, these installation dimmers only make a limited dimming capacity possible, a lower or low dimming setting with a low dimming level still being relatively high. Furthermore, it is also known to use so-called DALI (Digital Addressable Lighting Interface) dimmers in more modern systems. Such DALI dimmers make minimum dimming settings possible with a very low dimming level or a low dimming setting which are considerably lower than those of the abovementioned installation dimmers. If such DALI dimmers are used and very low dimming levels or an OFF setting is set, only an electronic disconnection, for example by means of a switch, is possible and, via radio interference suppression components connected to the switch, the electronic transformer is disadvantageously always restarted again, resulting in a noise development which may be disruptive particularly in the case of metal reflector lamps and which leads to increased radio interference.

The noise development as a result of the dimming of the mains voltage using phase chopping dimmers or phase gating dimmers in conjunction with electronic converters or transformers results in the case of very low dimming settings or even in the switched-off state of the electronic transformer.

DESCRIPTION OF THE INVENTION

The present invention is therefore based on the object of controlling the operation of the electronic transformer in such a way that the noise development as a result of dimming of the mains voltage can be prevented. In particular in the case of very low dimming settings or in the switched-off state of the electronic transformer, the noise development is intended to be prevented.

This object is achieved by a circuit arrangement having the features as claimed in patent claim 1. Furthermore, this object is also achieved by a method for controlling the operation of an electronic transformer having the features as claimed in patent claim 10.

A circuit arrangement according to the invention is designed for controlling the operation of an electronic transformer and therefore also for controlling a starting response of an electronic transformer. The electronic transformer is supplied with voltage via a mains voltage, it being possible for the mains voltage to be dimmed. The electronic transformer is electrically connected to an output of a switch for switching the electronic transformer on and off. Furthermore, this switch can be controlled via a control unit, a radio interference suppression circuit being coupled to this switch and it being possible for the radio interference suppression circuit to be disconnected from the switch and/or for the output of the switch to be short-circuited as a function of a control state present at this switch. The invention makes it possible to achieve a situation in which the noise development during dimming of the mains voltage can be markedly reduced. In particular at very low dimming settings or in the switched-off state of the electronic transformer, a noise development (brought about by so to speak automatic starting of the electronic transformer) can therefore be prevented. Particularly when the dimming of the mains voltage takes place by means of a dimmer, for example a DALI dimmer, which only switches off "electronically", this makes it possible to prevent the electronic transformer from always being restarted again and disruptive noise development being produced.

Advantageously, the circuit arrangement is designed in such a way that the radio interference suppression circuit can be disconnected from the switch and/or the output of the switch can be short-circuited if the control state present at the switch is characterized by non-driving of the switch by the control unit. In particular in those states in which no control signal is therefore transmitted from the control unit to the switch, provision is made for the radio interference suppression circuit to be disconnected from the switch and/or for the output of this switch to be short-circuited.

Furthermore, the circuit arrangement is configured in a preferred manner in such a way that the radio interference suppression circuit can be disconnected from the switch and/or the output of the switch can be short-circuited if a dimming setting of the supply voltage is less than 20% of a maximum dimming setting. In particular it is advantageous to disconnect the radio interference suppression circuit from the switch and/or to short-circuit the output of the switch if a dimming setting of the supply voltage or the mains voltage is less than 10%, in particular less than 5% of this maximum dimming setting. It is thus possible to achieve a situation in which the starting response of the electronic transformer can be varied at very low dimming settings to such an extent that continual restarting, in particular via the radio interference suppression circuit, can be prevented. The noise development of the electronic transformer and the electric lamp can therefore also be avoided.

The circuit arrangement is preferably also designed in such a way that the radio interference suppression circuit can be disconnected from the switch and/or the output of the switch can be short-circuited if the electronic transformer is switched off. In the case of the known dimming-concepts and in particular when a DALI dimmer is used, such a noise development of the electronic transformer may also be involved in the switched-off state. As a result of the preferred configuration of the invention, a corresponding noise development can therefore be prevented not only at very low dimming settings but also in the switched-off state of the dimmer.

Preferably, the circuit arrangement is designed in such a way that the radio interference suppression circuit can be electrically disconnected from the switch for switching the electronic transformer on and off by means of a further switch. In particular when the switch for switching the electronic transformer on and off is not driven by the control unit, the electrical disconnection of the radio interference suppression circuit from this switch can result in the starting response of the electronic transformer being changed. Restarting of the electronic transformer, in particular at very low dimming settings or in the switched-off state of the electronic transformer, can thereby be avoided.

Preferably, the radio interference suppression circuit is characterized by a series circuit comprising a resistor and a capacitor. The further switch for electrically disconnecting or electrically connecting the radio interference suppression circuit from or to the switch for switching the electronic transformer on and off can be connected in a series circuit between the resistor and the capacitor of the radio interference suppression circuit. Likewise, however, provision may also be made for this further switch to be connected downstream or upstream of the resistor and the capacitor.

Advantageously, the circuit arrangement is designed in such a way that the output of the switch can be short-circuited via a circuit branch, which is connected in parallel with the electronic transformer. This configuration of the parallel circuit branch is also particularly advantageous if non-driving of the switch for switching the electronic transformer on and off is provided. The circuit branch preferably has a resistor and a dedicated switch. This configuration makes it possible to achieve a situation in which, in particular in the state of non-driving of the switch for switching the electronic transformer on and off, the output of the switch for switching the electronic transformer on and off is in practice short-circuited by this resistor in the signal branch and therefore the output voltage of this switch is limited to values which are below a voltage threshold value. This voltage threshold value is selected in such a way that it is below the starting voltage of the electronic transformer. As a result, restarting of the electronic transformer at very low dimming settings or in the switched-off state of the dimmer is prevented. A voltage with a value of approximately 33V or less can be provided, for example, for this voltage threshold value. A voltage value of approximately 33V approximately corresponds to a starting voltage of a DIAC, which is generally provided in such an electronic transformer for starting purposes.

In a method according to the invention for controlling the operation of an electronic transformer, whose voltage supply can be dimmed, the electronic transformer is electrically connected to an output of a switch for switching the electronic transformer on and off. According to the method, the switch is controlled via a control unit, a radio interference suppression circuit being coupled to the switch and the radio interference suppression circuit being disconnected from the switch and/or the output of the switch being short-circuited as a function of a control state present at the switch for controlling the starting response of the electronic transformer. Improved operational response of the electronic transformer can also be achieved by the method according to the invention. In particular when very low dimming settings or even a switched-off state of the electronic transformer is provided, undesirable restarting of the electronic transformer and undesirable and disruptive noise development associated therewith can be prevented. In particular when the dimming setting can be set even to very low dimming settings by means of a DALI dimmer or generally a dimmer which disconnects merely "electronically", the starting response of the electronic transformer can be influenced in a desirable manner.

Advantageous configurations of the circuit arrangement according to the invention are, where transferable, also to be regarded as advantageous configurations of the method according to the invention.

BRIEF DESCRIPTION OF THE DRAWINGS

The invention will be explained in more detail below with reference to schematic drawings, in which.

PREFERRED EMBODIMENT OF THE INVENTION

Figure 1:
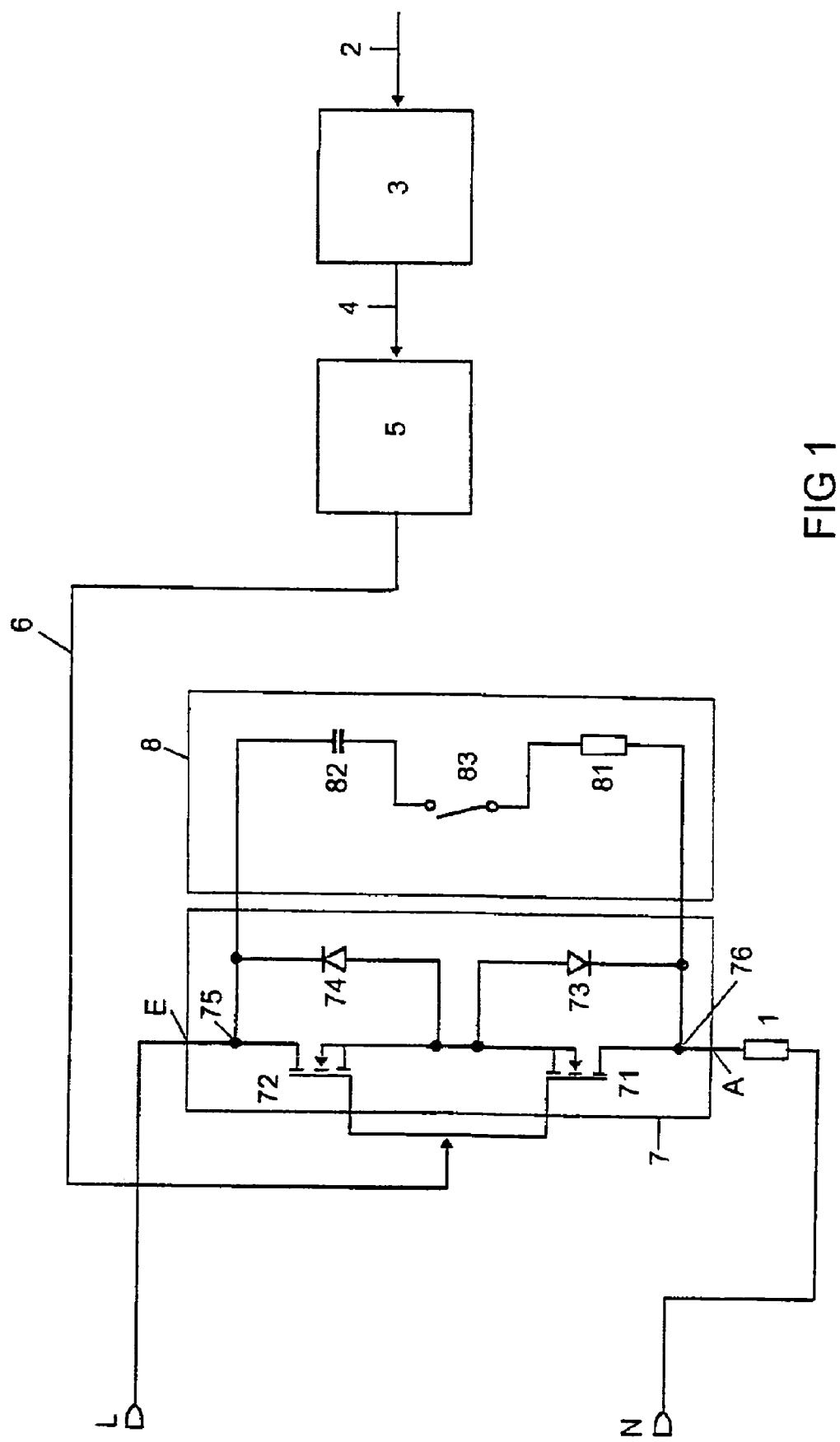
FIG. 1 shows a first exemplary embodiment of the circuit arrangement according to the invention.
Figure 2:
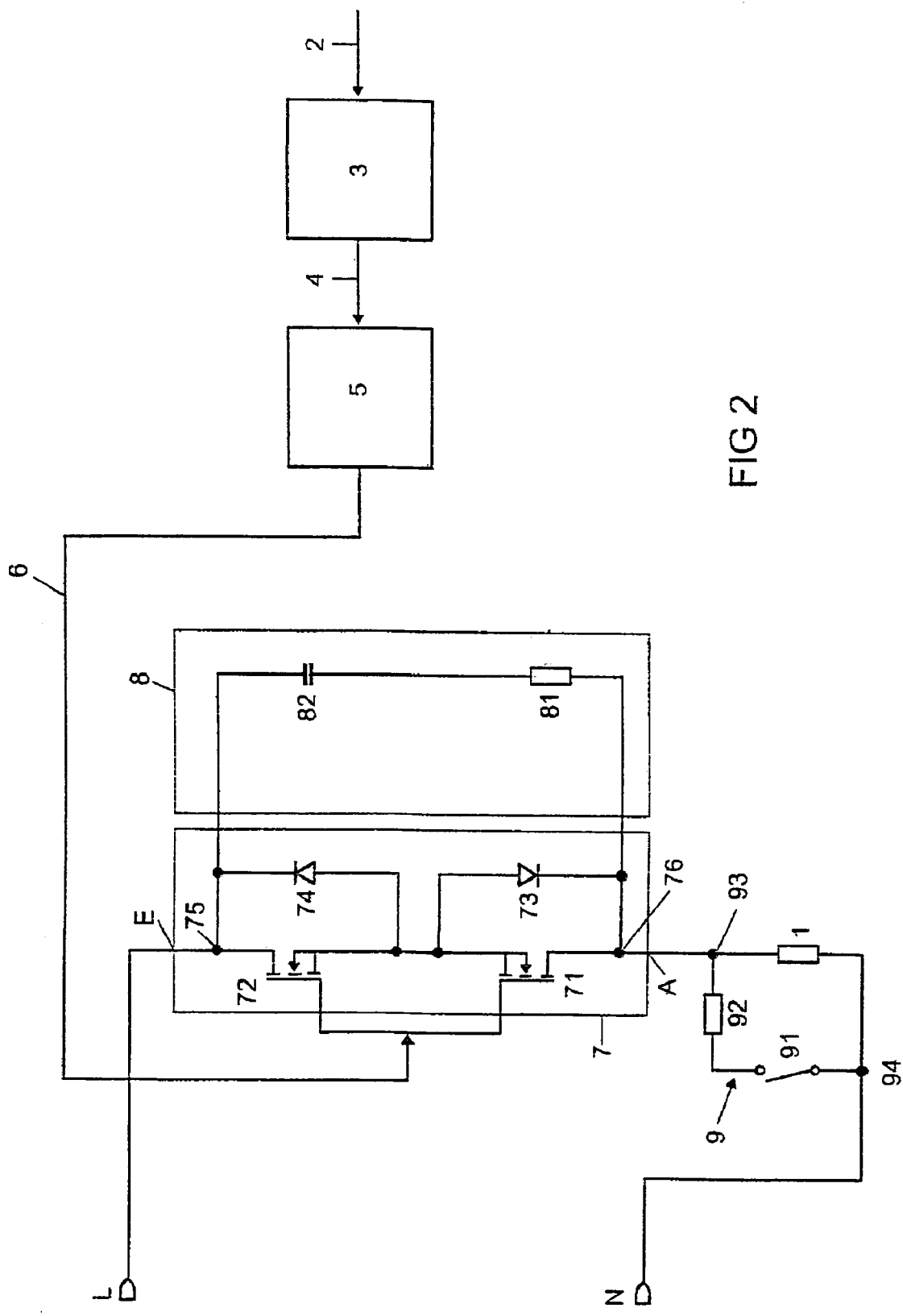
FIG. 2 shows a second exemplary embodiment of the circuit arrangement according to the invention.

Identical or functionally identical elements have been provided with the same reference symbols in FIGS. 1 and 2.

FIG. 1 shows a first exemplary embodiment of a circuit arrangement for controlling the operation of an electronic transformer 1. The electronic transformer 1 is characterized symbolically in FIG. 1 by the load element illustrated. It is known that such electronic transformers 1 have a half-bridge configuration. Furthermore, such electronic transformers 1 comprise a run-up circuit, which has a pulse emitter, for example a DIAC, and a capacitor and possibly further components, by means of which the stimulating of an oscillator of the electronic transformer can be brought about after the switch-on process. The voltage supply to the electronic transformer 1 takes place via the mains voltage terminals L and N. In the exemplary embodiment shown, the mains voltage can be dimmed. For this purpose, a DALI dimmer is provided, a corresponding dimming signal 2 being transmitted to a DALI interpreter 3. This dimming signal 2, which characterizes a DALI command, can be produced, for example, by the actuation of a pushbutton. The DALI interpreter 3 produces an output signal 4, which is transmitted to a control unit 5. The output signal 4 characterizing the desired dimming setting is transmitted to a control unit 5, which produces a control signal 6 as a function of this output signal 4 of the DALI interpreter 3, which control signal 6 can be applied to a switch 7. The switch 7 is preferably in the form of a surge-proof switch.

As can be seen from the illustration in FIG. 1, the switch 7 for switching the electronic transformer 1 on and off is connected with an input E to a terminal L of the mains voltage. Furthermore, the switch 7 is electrically connected with an output A to the electronic transformer 1.

An electric lamp (not illustrated), which is electrically connected to the electronic transformer 1, for example a metal reflector lamp, is supplied with energy by means of said electronic transformer 1.

As can be seen in FIG. 1, the switch 7 comprises a first transistor 71 and a second transistor 72, the two transistors 71 and 72 being in the form of an n-channel MOSFET in the exemplary embodiment. As can be seen, the gate terminals of these two transistors 71 and 72 are connected to the control unit 5, with the result that the control signal 6 is present at these gate terminals. In the exemplary embodiment, the drain terminal of the transistor 71 is electrically connected to the output A. The source terminal of the transistor 71 is connected to the source terminal of the transistor 72, the drain terminal of the transistor 72 being connected to the input E. Furthermore, the switch 7 comprises a first diode 73 and a second diode 74.

In the exemplary embodiment, a radio interference suppression circuit 8 is electrically coupled to the switch 7. The radio interference suppression circuit 8 is designed to avoid or reduce radio interference and to attenuate voltage peaks.

In the exemplary embodiment, the radio interference suppression circuit 8 has a resistor 81 and a capacitor 82, which are connected in series. As can be seen, a further switch 83 is arranged between the resistor 81 and the capacitor 82.

In the exemplary embodiment shown in FIG. 1, electronic disconnection of the electronic transformer 1 from the DALI dimmer is possible at very low dimming settings which are so low that restarting of the electronic transformer may take place. The dimming settings which can bring about this restarting can be, for example, less than 20% of the maximum dimming setting, in particular less than 10% of the maximum dimming setting, in particular less than 5% of the maximum dimming setting. If the gate terminals of the transistors 71 and 72 are driven via the control unit 5 by means of the drive signal 6, these two transistors 71 and 72 are turned on and dimming of the mains voltage or the voltage supply to the electronic transformer 1 can be carried out. In this state, if a control signal 6 is present, the switch 83 is closed.

If there is no control signal 6 present at the gate terminals of the transistors 71 and 72, the switch 83 is open. As a result, the radio interference suppression circuit 8 is electronically disconnected from the switch 7. As a result, it is also possible to prevent a situation in which the mains voltage enters the radio interference suppression circuit 8 via a circuit node 75 of the switch 7 and from there arrives at the output A of the switch 7, via a further circuit node 76 of the switch 7, and therefore at the electronic transformer 1. If this switch 83 were not to be opened in the event of non-driving of the gate terminals of the transistors 71 and 72 by the control signal 6, the mains voltage would be conducted to the electronic transformer 1 precisely via this above described signal path with such a voltage value which would bring about continuous restarting since this voltage would be above a first voltage threshold value, which would also be greater than the starting voltage of the electronic transformer 1, in particular of a DIAC. As a result of this continual restarting, the undesirable noise development would then also be produced. As a result of the electrical decoupling of the radio interference suppression circuit 8 from the switch 7 during non-driving of this switch 7 by the control unit 5 by the switch 83 being open in this non-driving state, ever recurring restarting of the electronic transformer and therefore undesirable noise development can therefore be prevented.

A further exemplary embodiment of the invention is shown in FIG. 2. In contrast to the exemplary embodiment in FIG. 1, in this case the radio interference suppression circuit 8 does not have a switch 83 and is merely formed by the series circuit comprising the resistor 81 and the capacitor 82. As can be seen in FIG. 2, a circuit branch 9, which is connected to the circuit nodes 93 and 94, is connected in parallel with the electronic transformer 1. In the exemplary embodiment, the circuit branch 9 comprises a switch 91 and a resistor 92. The resistor 92 can be in the form of nonreactive resistance or else in the form of a Zener diode. As a result of the exemplary embodiment shown in FIG. 2, in turn in the non-driving state (no control signal 6 is present at the gate terminals of the transistors 71 and 72), recurring restarting of the electronic transformer 1 and therefore associated noise development can be prevented. In the exemplary embodiment shown in FIG. 2, in the non-driving state of the switch 7 the switch 91 in the circuit branch 9 is closed and therefore the output A of the switch 7 is short-circuited by the load or the resistor 92 and therefore the output voltage at the output A of the switch 7 is limited to values which are below the voltage threshold value. The voltage threshold value can in this case be predetermined in such a way that it is below a starting voltage of the electronic transformer. If the electronic transformer 1 has a DIAC as the starter, the first voltage threshold value can be predetermined with a value which is approximately 33V or less than 33V since the starting voltage of such DIACs is approximately 33V. As a result of the configuration in FIG. 2, a very effective and efficient procedure can likewise be provided with which the operating state, in particular the starting response of the electronic transformer 1 can be optimized to such an extent that continual restarting and associated noise development takes place at very low dimming settings or in the switched-off state.

Provision may also be made for the embodiments in FIGS. 1 and 2 to be realized in common. The switch 83 and/or the switch 91 can be implemented as TRIACs, which are driven by an optocoupler.

Instead of the DALI dimmer, provision may also be made for a potentiometer to be provided for setting the dimming settings. In principle it is possible for any dimmer to be provided which disconnects merely "electronically".

The invention claimed is:

1. A circuit arrangement for controlling the operation of an electronic transformer, whose voltage supply can be dimmed, the electronic transformer being electrically connected to an output of a switch, and the switch is controlled by a control unit, a radio interference suppression circuit being coupled to the switch and it being possible for the radio interference suppression circuit to be disconnected from the switch and/or for the output of the switch to be short-circuited as a function of a control state present at the switch for controlling the starting response of the electronic transformer, wherein noise development is reduced.

2. The circuit arrangement as claimed in claim 1, wherein the radio interference suppression circuit can be disconnected from the switch and/or the output of the switch can be short-circuited if the control state present at the switch is characterized by non-driving of the switch by the control unit.

3. The circuit arrangement as claimed in claim 2, wherein the radio interference suppression circuit can be disconnected from the switch and/or the output of the switch can be short-circuited if a dimming setting of the supply voltage is less than 20% of a maximum dimming setting.

4. The circuit arrangement as claimed in claim 3 wherein the dimming setting is less than 10% of a maximum dimming setting.

5. The circuit arrangement as claimed in claim 3, wherein the dimming setting is less than 5% of a maximum dimming setting.

6. The circuit arrangement as claimed in claim 2, wherein the radio interference suppression circuit can be disconnected from the switch and/or the output of the switch can be short-circuited if the electronic transformer is switched off.

7. The circuit arrangement as claimed in claim 2, wherein the radio interference suppression circuit has a further switch, and the radio interference suppression circuit can be disconnected from the switch for the purpose of switching the electronic transformer on and off by means of the further switch.

8. The circuit arrangement as claimed in claim 2, wherein the output of the switch can be short-circuited via a circuit branch, which is connected in parallel with the electronic transformer.

9. The circuit arrangement as claimed in claim 1, wherein the radio interference suppression circuit can be disconnected from the switch and/or the output of the switch can be short-circuited if a dimming setting of the supply voltage is less than 20% of a maximum dimming setting.

10. The circuit arrangement as claimed in claim 9, wherein the dimming setting is less than 10% of a maximum dimming setting.

11. The circuit arrangement as claimed in claim 9, wherein the dimming setting is less than 5% of a maximum dimming setting.

12. The circuit arrangement as claimed in claim 9, wherein the dimming setting is predetermined by a DALI dimmer, which is electrically connected to the control unit.

13. The circuit arrangement as claimed in claim 1, wherein the radio interference suppression circuit can be disconnected from the switch and/or the output of the switch can be short-circuited if the electronic transformer is switched off.

14. The circuit arrangement as claimed in claim 1, wherein the radio interference suppression circuit has a further switch, and the radio interference suppression circuit can be disconnected from the switch for the purpose of switching the electronic transformer on and off by means of the further switch.

15. The circuit arrangement as claimed in claim 14, wherein the radio interference suppression circuit is a series circuit comprising a resistor and a capacitor.

16. The circuit arrangement as claimed in claim 1, wherein the output of the switch can be short-circuited via a circuit branch, which is connected in parallel with the electronic transformer.

17. The circuit arrangement as claimed in claim 16, wherein the circuit branch has a switch and a resistor.

18. The circuit arrangement as claimed in claim 1, wherein noise development is prevented.

19. A method for controlling the operation of an electronic transformer, whose voltage supply can be dimmed, comprising:
- connecting electrically the electronic transformer to an output of a switch;
- controlling the switch by means of a control unit;
- coupling a radio interference suppression circuit to the switch;
- disconnecting the radio interference suppression circuit from the switch and/or short-circuiting the output of the switch as a function of a control state present at the switch for controlling the starting response of the electronic transformer;
- wherein noise development is reduced or prevented.

* * * * *